(12) United States Patent
Randall et al.

(10) Patent No.: US 8,145,610 B1
(45) Date of Patent: Mar. 27, 2012

(54) PASSING INFORMATION BETWEEN SERVER AND CLIENT USING A DATA PACKAGE

(75) Inventors: Craig Randall, Pleasanton, CA (US); Alex Rankov, Danville, CA (US); Meir Amiel, Pleasanton, CA (US); Victor Spivak, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 454 days.

(21) Appl. No.: 11/904,624

(22) Filed: Sep. 27, 2007

(51) Int. Cl.
*G06F 7/00* (2006.01)
*G06F 17/00* (2006.01)

(52) U.S. Cl. ........ 707/703; 707/736; 707/826; 707/922; 709/201; 709/202; 709/203; 709/217; 709/246

(58) Field of Classification Search ................. 707/1, 10, 707/100, 200, 602, 687, 703, 736, 826, 922, 707/999.1; 709/201, 203, 217, 202, 227, 709/246

See application file for complete search history.

(56) References Cited

U.S. PATENT DOCUMENTS

| | | | | |
|---|---|---|---|---|
| 5,987,422 A * | 11/1999 | Buzsaki | ...................... | 705/7.13 |
| 6,463,456 B1 * | 10/2002 | Kan et al. | ...................... | 709/201 |
| 6,807,181 B1 * | 10/2004 | Weschler | ...................... | 370/400 |
| 2006/0058987 A1 * | 3/2006 | Kumar et al. | ...................... | 703/2 |
| 2006/0075007 A1 * | 4/2006 | Anderson et al. | ............. | 707/206 |
| 2007/0150589 A1 * | 6/2007 | Kim et al. | ...................... | 709/224 |
| 2007/0185868 A1 * | 8/2007 | Roth et al. | ...................... | 707/6 |
| 2007/0220199 A1 * | 9/2007 | Moore et al. | .................. | 711/112 |
| 2008/0270461 A1 * | 10/2008 | Gordon et al. | ............ | 707/103 R |

* cited by examiner

*Primary Examiner* — Hares Jami
(74) *Attorney, Agent, or Firm* — Van Pelt, Yi & James LLP

(57) ABSTRACT

Processing for a data package is disclosed. An operation is received including a data package. The operation is performed with respect to each of one or more data objects included in the data package, in a manner determined at least in part by a context data applicable to the operation.

12 Claims, 10 Drawing Sheets

PASSING INFORMATION BETWEEN SERVER AND CLIENT USING A DATA PACKAGE

BACKGROUND OF THE INVENTION

A user can be offered services where the services are executed predominantly on a server and the user accesses the services using a client that is in communication with the server via a network connection. The services can be composed of complex processes that are supported by software, processing, storage, and other resources that are available to the server without significant resource requirements from the client. However, one problem with this model for offering services is that there are limitations for the communication between the server and the client. For example, there is a finite time that it takes for information to travel between the server and the client or the client and the server. In addition, in order to support the complex processing available on the server, the client may need to provide the server information in many forms and configurations.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a non-transitory computer readable medium, a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A data model for service architecture is disclosed. The data model comprises a data package that is capable of efficiently passing complex information between a server and a client. The data package in various embodiments can include multiple data objects with their associated types, identities, properties, relations, content, permissions, exception handling information, customization information, and/or metadata. Both client and server are able to interpret information contained within a data package enabling the data package to be a universal and flexible communication vehicle between the client and server. The data package simplifies inbound and outbound interface software for a client and/or a server in that a single interface can be used for all service software.

Figure 1:
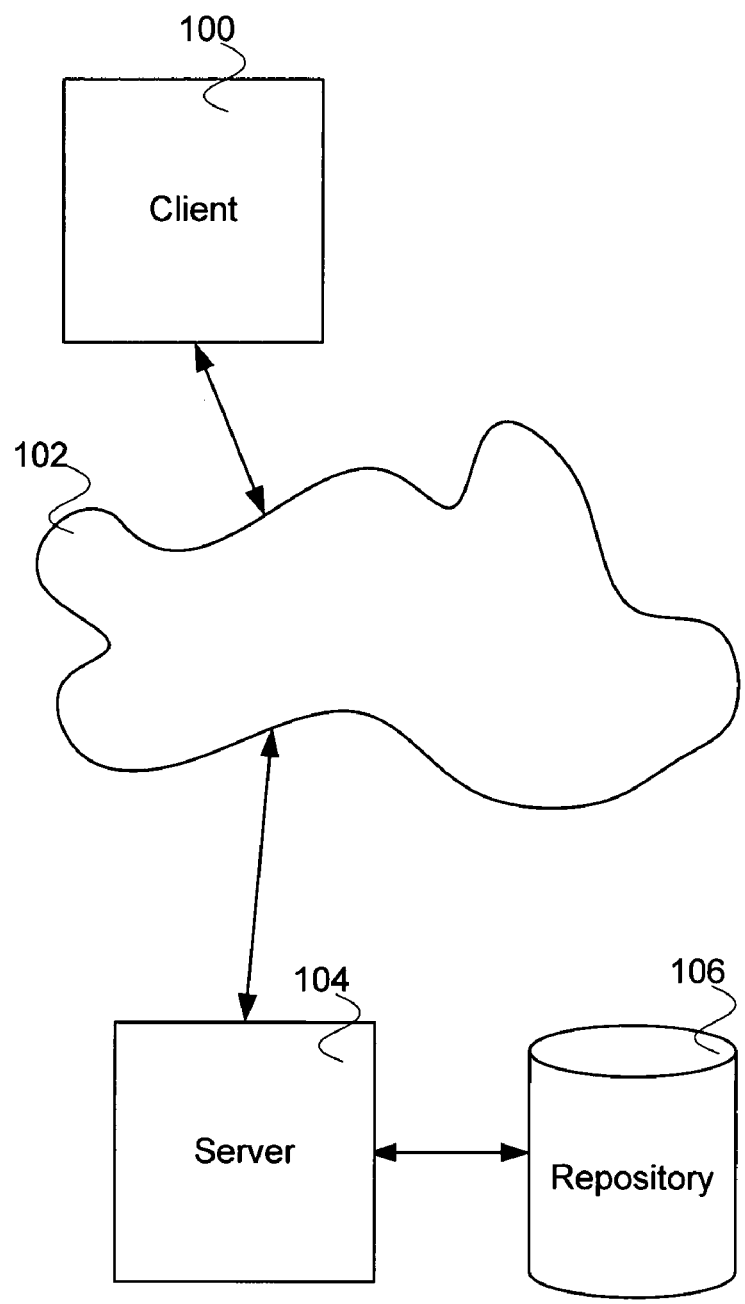
FIG. 1 is a block diagram illustrating an embodiment of a system utilizing a data package.

FIG. 1 is a block diagram illustrating an embodiment of a system utilizing a data package. In the example shown, server 104 receives from client 100 via network 102 an operation including a data package and operation option(s). The data package is processed according to the operation option(s) as indicated by the operation.

Client 100 receives user input information and is part of a distributed application architecture, where resources associated with client 100 and server 104 are used in the processing of information for a user. Information can be sent between client 100 and server 104 using network 102. In various embodiments, network 102 comprises a wired network, a wireless network, a local area network, a wide area network, the Internet, or any other appropriate network for communicating data. Server 104 can access data and store data in repository 106. In some embodiments, server 104 manages content (e.g., retention management, search management, security management, as used in work flows, etc.) using repository 106 as a content repository.

In some embodiments, server 104 comprises one or more servers or computer and/or storage systems.

Figure 2:
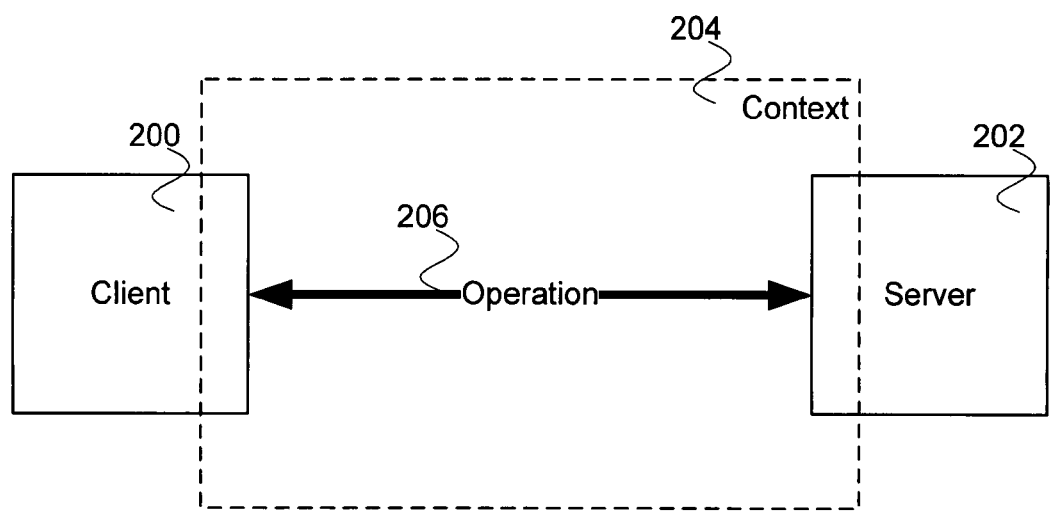
FIG. 2 is a block diagram illustrating an embodiment of a system for utilizing a data package.

FIG. 2 is a block diagram illustrating an embodiment of a system for utilizing a data package. In the example shown, client 200 and server 202 communicate regarding operation 206 within context 204. Context 204 comprises a collection of settings and defaults for interactions between client 200 and server 202. The collection of settings and defaults includes one or more default context profiles regarding settings and defaults for an operation such as operation 206. Context 204 is established when establishing a communication session between client 200 and server 202. In some embodiments, context 204 is established on installation on client 200 of client software that is compatible with server software of server 202. Operation 206 includes a repository object operation comprising an operation on repository objects (e.g., create, create a path, get, update, delete, copy, move, validate, get object content), a version operation comprising an operation that enables access and changes to specific object versions (e.g., get check out information, check out, check in, cancel check out, delete version, delete all versions, get current, get version information), a schema operation comprising an operation to retrieve information regarding repository schemas (e.g., get schema information, get repository information, get type information, get property information, get dynamic assist values), a repository retrieval operation comprising an operation for retrieving information from one or more repositories (e.g., query, structured query, pass through query, query execution, get repository list), and a workflow operation comprising an operation regarding workflow processes (e.g., get process templates stored in repository, get process information, start process).

Figure 3:
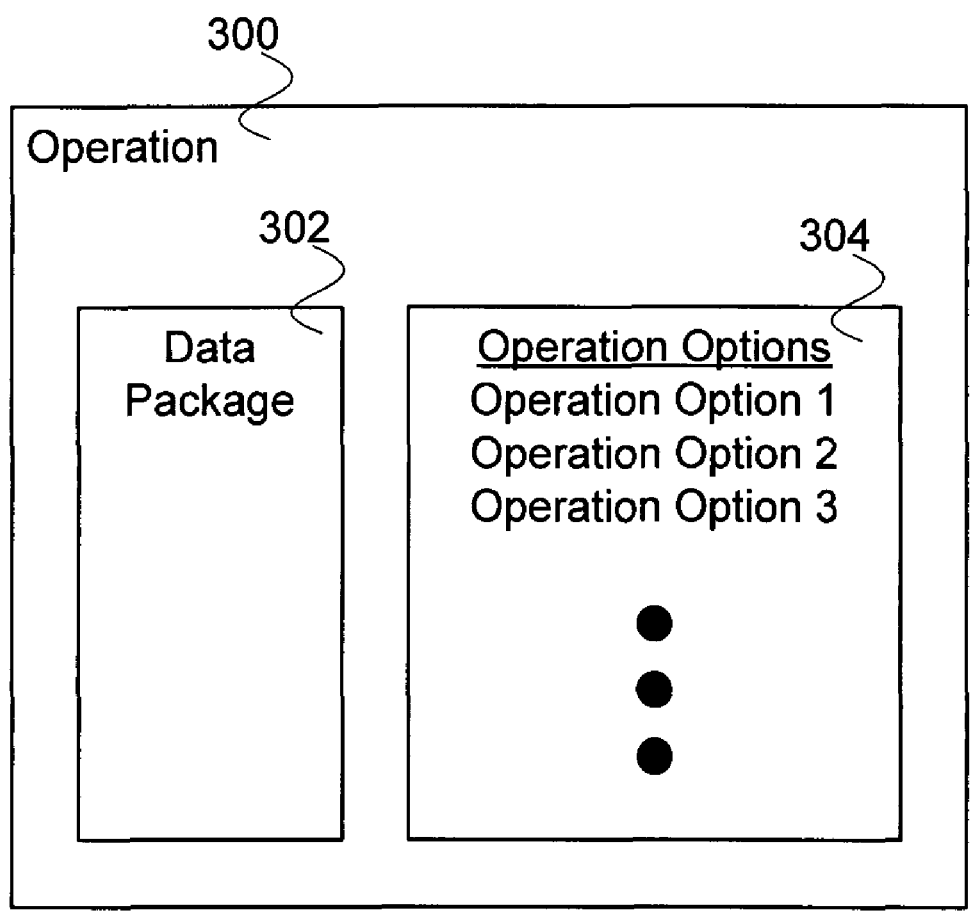
FIG. 3 is a block diagram illustrating an embodiment of an operation.

FIG. 3 is a block diagram illustrating an embodiment of an operation. In the example shown, operation 300 includes data package 302 and one or more operation options 304 represented in FIG. 3 as a plurality of operation options such as operation option 1, operation option 2, and operation option 3. An operation option can be indicated via an operation option context profile, which includes information that is used to modify the processing of the operation. For example, a relationship profile indicates how deep in terms of related objects an operation is to process an object such as by setting a relation filter that limits the size and complexity of object instances returned by services (e.g., returning the instances by reference identifier or by entire copies of instances of objects) or the categories of related objects returned by the service (e.g., filtered by name of relation, by target role, by depth); and/or a delete profile indicates what an operation is to do in terms of deleting objects related to the object being processed; or a property profile enables the setting of property filters that limit the properties returned with an object by a service (e.g., none, specified by an include list, specified by an exclude list, all non-system properties, or all). For other examples, a content profile enables the setting of content filters that limit the content returned by a service (e.g., none, specified format filter, any format, specified page number, any page number, rendition specified, any rendition (e.g., different resolution settings for images or sound recordings) or a post service and transfer action (e.g., opening the returned content in viewing or editing application); and/or a permission profile that enables the setting of a permission filter that limits the permissions of objects returned by the service (e.g., none, any, or specified permissions by type).

Figure 4A:
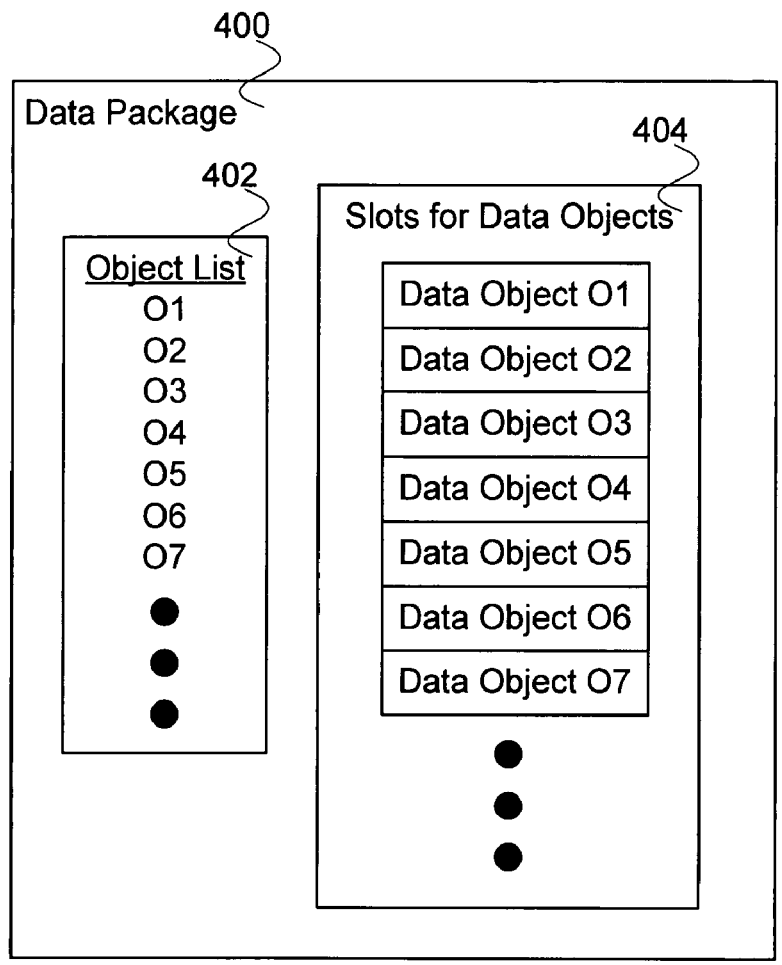
FIG. 4A is a block diagram illustrating an embodiment of a data package.

FIG. 4A is a block diagram illustrating an embodiment of a data package. In some embodiments, the data package of FIG. 4A is used to implement data package 302 of FIG. 3. In the example shown, data package 400 includes object list 402 and slots for data objects 404. Object list 402 lists objects included in data package 400 (e.g., a single object or multiple objects). Object list 402 includes a plurality of objects represented in FIG. 4 by O1, O2, O3, O4, O5, O6, and O7. Slots for data objects 404 are used to store objects in object list 402. Slots for data objects 404 includes a plurality of objects represented in FIG. 4 by data object O1, data object O2, data object O3, data object O4, data object O5, data object O6, and data object O7. In the event that there is only one or no listed object in object list 402, then slots for data objects 404 includes a single or no object.

Figure 4B:
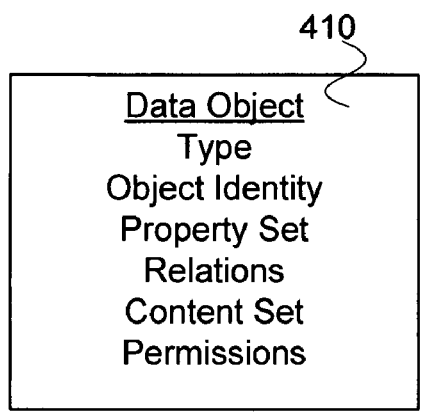
FIG. 4B is a block diagram illustrating an embodiment of a data object.

FIG. 4B is a block diagram illustrating an embodiment of a data object. In some embodiments, the data object of FIG. 4B is used to implement one of the data objects in slots for data objects 404 of FIG. 4A. In the example shown, data object 410 includes type, object identity, property set, relations, content set, and permissions. Note that although data object 410 includes type, object identity, property set, relations, content set, and permissions, each are optional for a data object and can be either included or not included in a given data object.

Type information indicates the type of the data object. If type information is omitted, then the data object is assumed to be of a default type (e.g., a document).

Figure 4C:
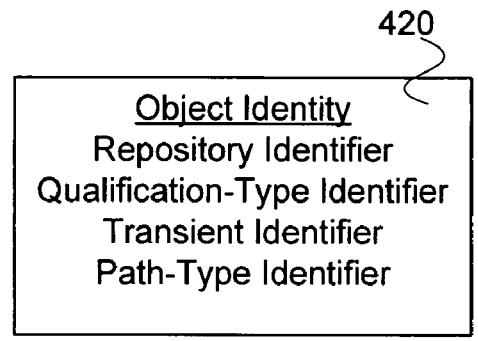
FIG. 4C is a block diagram illustrating an embodiment of an object identity.

FIG. 4C is a block diagram illustrating an embodiment of an object identity. In some embodiments, the object identity of FIG. 4C is used to implement object identity of FIG. 4B. In the example shown, object identity 420 includes one of the following: repository identifier, qualification-type identifier, transient identifier, or path-type identifier. Note that although as depicted in FIG. 4C object identity 420 includes repository identifier, qualification-type identifier, transient identifier, and path-type identifier only one form or no form of object identity can exist at one time. In various embodiments, a qualification-type identifier comprises a set of instructions, a query, or any other appropriate qualification used as an identifier.

A repository identifier comprises an identifier that is a unique identifier generated by a content server for a specific version of a repository object. A qualification-type identifier comprises an identifier that specifies criteria for selecting one or more repository objects. For example, a qualification-type identifier identifies document(s) where the name of the document is "sample_image." Note that in the event that there are multiple documents with the given name, other qualifiers can be used to uniquely identify which document or version of the document is being identified. A transient identifier comprises an identifier that identifies a document that is a temporary document. A transient identifier is given by a calling application. In various embodiments, the transient identifier comprises a sequence number, a globally unique identifier, or any other appropriate identifier. For example, an application requesting an action on multiple objects assigns internal identifiers and associates them with some application specific elements. As a specific example, an application desires to add 3 files to a repository and assign metadata to each of the files separately; each file in the list is assigned a unique transient identifier (e.g., file0, file1, file2); if the operation fails during the processing of file2, the application can determine that file2, for example, failed to be added and indicate that to a user to see of a retry is desired. A path-type identifier comprises information that specifies a path to an object in a repository.

Figure 4D:
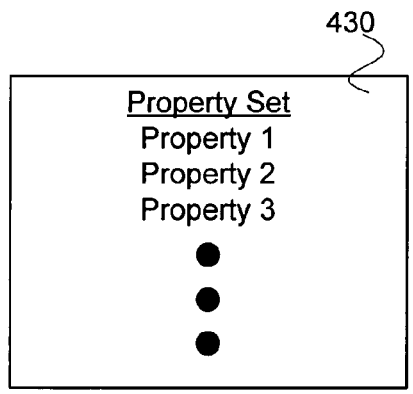
FIG. 4D is a block diagram illustrating an embodiment of a property set.

FIG. 4D is a block diagram illustrating an embodiment of a property set. In some embodiments, the property set of FIG. 4D is used to implement the property set of FIG. 4B. In the example shown, property set 430 includes a plurality of properties represented in property set 430 by property 1, property 2, and property 3. A property can be a string property, a number property, a date property, a Boolean property, an object ID property, or an array of properties. In various embodiments, properties are referred to as object attributes or metadata.

Figure 4E:
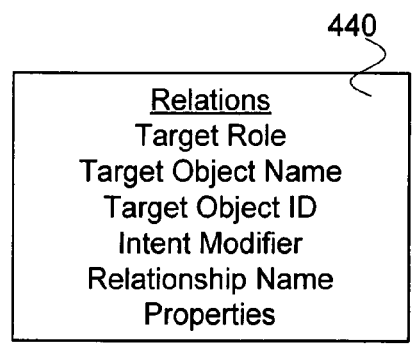
FIG. 4E is a block diagram illustrating an embodiment of a set of attributes and/or data used to define relations.

FIG. 4E is a block diagram illustrating an embodiment of a set of attributes and/or data used to define relations. In some embodiments, relations as defined in FIG. 4E are used to implement relations of FIG. 4B. In the example shown, relations 440 includes target role, target object name, target object ID, intent modifier, relationship name, and properties.

Possible target roles include parent, child, or a custom role. A target object name is the name of the target object with which the object has a relation. A target object ID is the identifier of the target object with which the object has a relation. An intent modifier comprises an indication of how a client/user intends for related objects to be handles during an update operation (e.g., updated, added, or removed). A relationship name comprises a name of the relationship (e.g., folder, type name, or any other appropriate name for the relation). The term "properties" indicates a property set that includes custom properties associated with the relation.

Figure 4F:
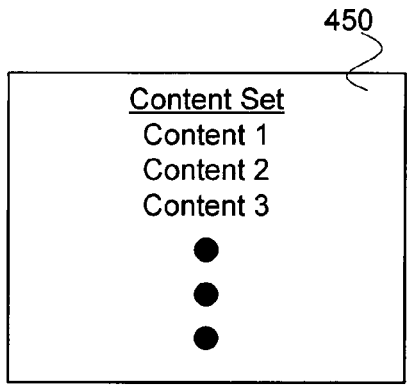
FIG. 4F is a block diagram illustrating an embodiment of a content set.

FIG. 4F is a block diagram illustrating an embodiment of a content set. In some embodiments, the content set of FIG. 4F is used to implement the content set of FIG. 4B. In the example shown, content set 450 includes a plurality of content represented in content set 450 by content 1, content 2, and content 3. A "content" is an instance of a type of content (e.g., file content, byte array, or Java object). In some embodiments, content is specified such that it includes an entire document, one or more portions of a document, or any other appropriate subset, superset, or combinations thereof of repository content. In some embodiments, when a content set is processed, each content object of the content set can be asynchronously transferred or passed directly as bytes. The transfer of content items can be complex for the processing using a service architecture because the processing can involve multiple servers and a content item may be required to traverse multiple hops before reaching its destination. To address issues with regard to scaling and in order to meet user expectations (e.g., regarding response delays), optimizations of point-to-point and end-to-end content transfers are used. In various embodiments, direct transfers between a source and a destination are used for content transfer, a http secure link is used for content transfer, a base64 extensible markup language (XML) schema encoding and decoding are used for the content transfer, a message transmission optimization mechanism for encoding and decoding are used for the content transfer, or the use of any other appropriate methods for transferring content.

Figure 4G:
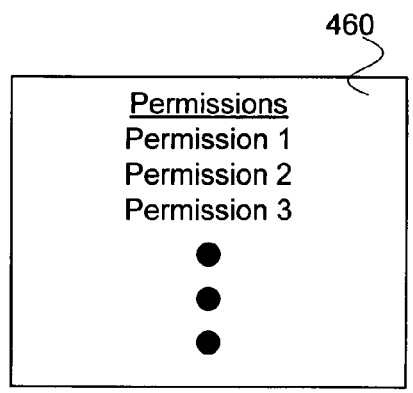
FIG. 4G is a block diagram illustrating an embodiment of permissions.

FIG. 4G is a block diagram illustrating an embodiment of permissions. In some embodiments, the permissions of FIG. 4G is used to implement the permissions of FIG. 4B. In the example shown, permissions 460 includes a plurality of permissions represented in permissions 460 by permission 1, permission 2, and permission 3. A permission is "resolved" based on a current user's privileges for a given data object. For example, if a current user (represented in the context of an operation call) has read-only access to a given folder A, when the folder A is returned as a result of the operation call, the associated permission for the folder explicitly indicates the read-only access level. A permission indicates permissions related to a data object that is stored in a repository. A permission includes a permission type (e.g., basic, extended, or custom). A basic permission type can take on one or more values (e.g., none, browse (i.e., view attributes), read, relate (i.e., attach annotations), version, write, delete, etc.). An extended permission type can take on one or more values (e.g., change location, change owner, change permission, delete object, execute procedure). In some embodiments, permissions are compound (sometimes called hierarchical); there are levels of permission where if a given permission is allowed, all lower level permissions are also allowed. For example, if a user has relate permissions on an object, the user is granted read and browse permissions as well.

Figure 5:
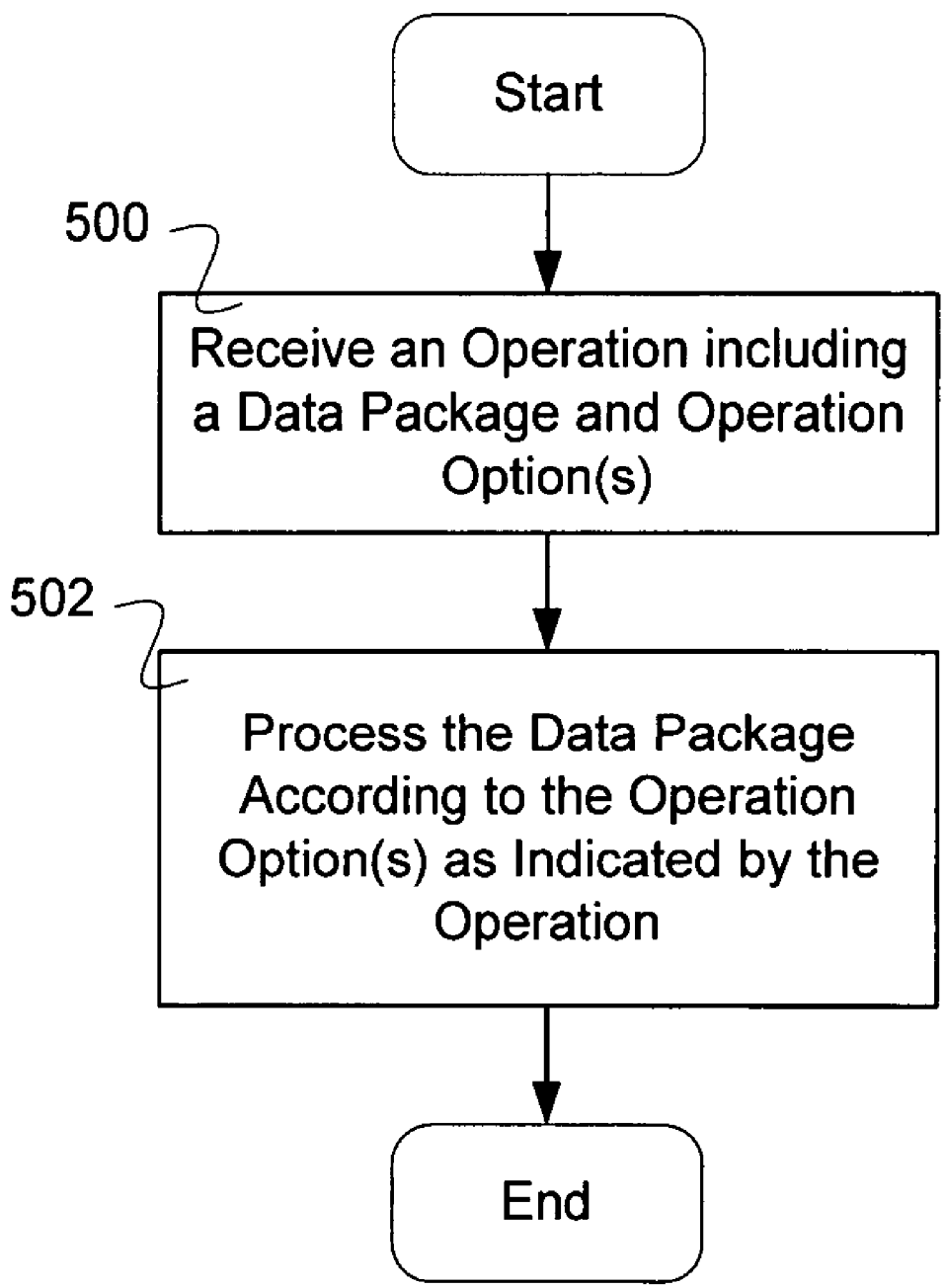
FIG. 5 is a flow diagram illustrating an embodiment of a process utilizing a data package.

FIG. 5 is a flow diagram illustrating an embodiment of a process utilizing a data package. In the example shown, in 500 an operation is received including a data package and operation option(s). In 502, the data package is processed according to the operation option(s) as indicated by the operation. Data package is processed considering context information (e.g., settings and defaults including one or more default context profiles) that may apply to the processing of an operation.

Figure 6:
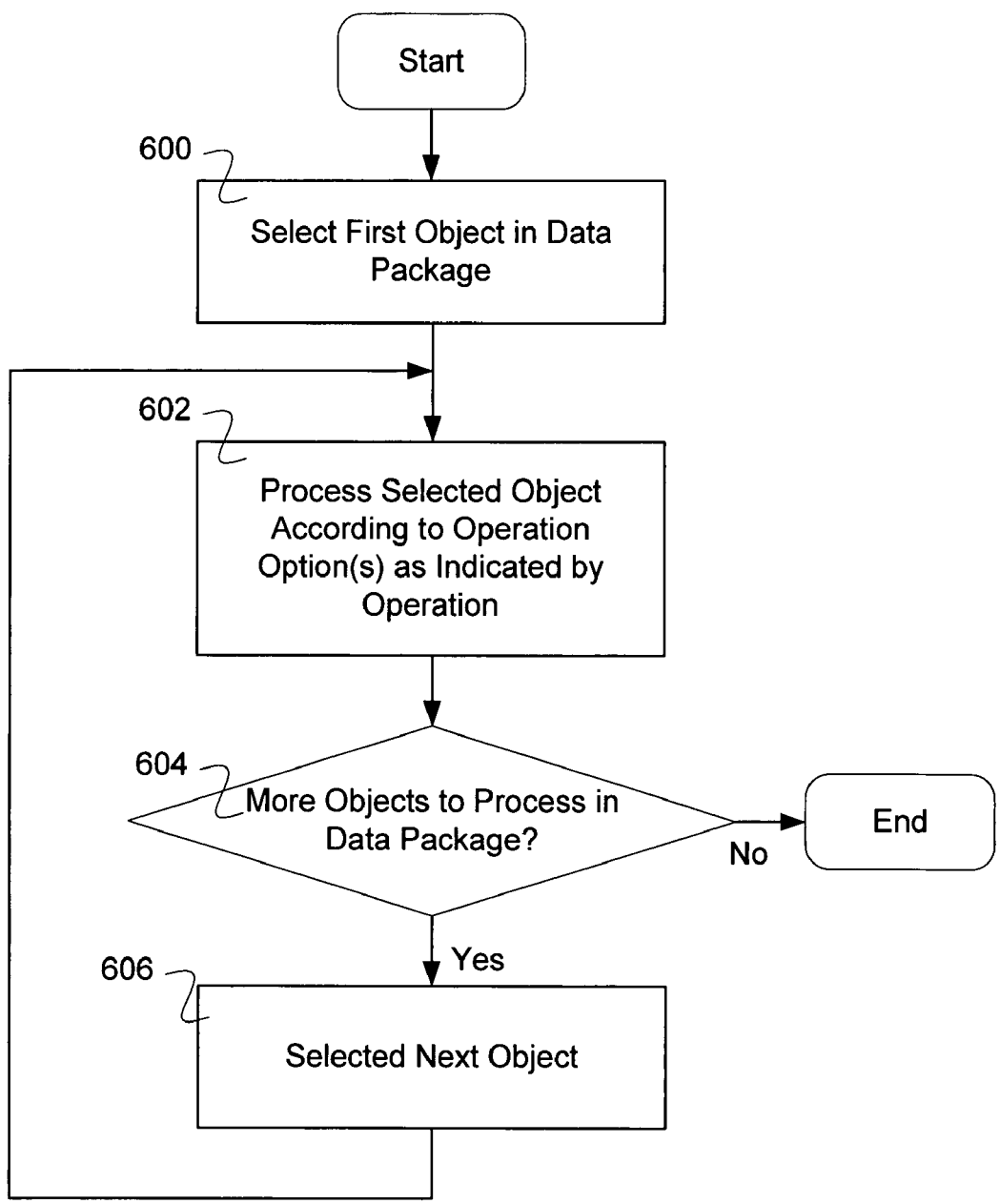
FIG. 6 is a flow diagram illustrating an embodiment of a process for processing a data package.

FIG. 6 is a flow diagram illustrating an embodiment of a process for processing a data package. In some embodiments, the process of FIG. 6 is used to implement 502 of FIG. 5. In the example shown, in 600 a first object in the data package is selected. In 602, the selected object is processed according to operation option(s) as indicated by the operation. In 604, it is determined if there are more objects to process in the data package. If there are more objects to process in the data package, then in 606, a next object is selected, and control passes to 602. If there are no more objects to process, then the process ends.

Figure 7:
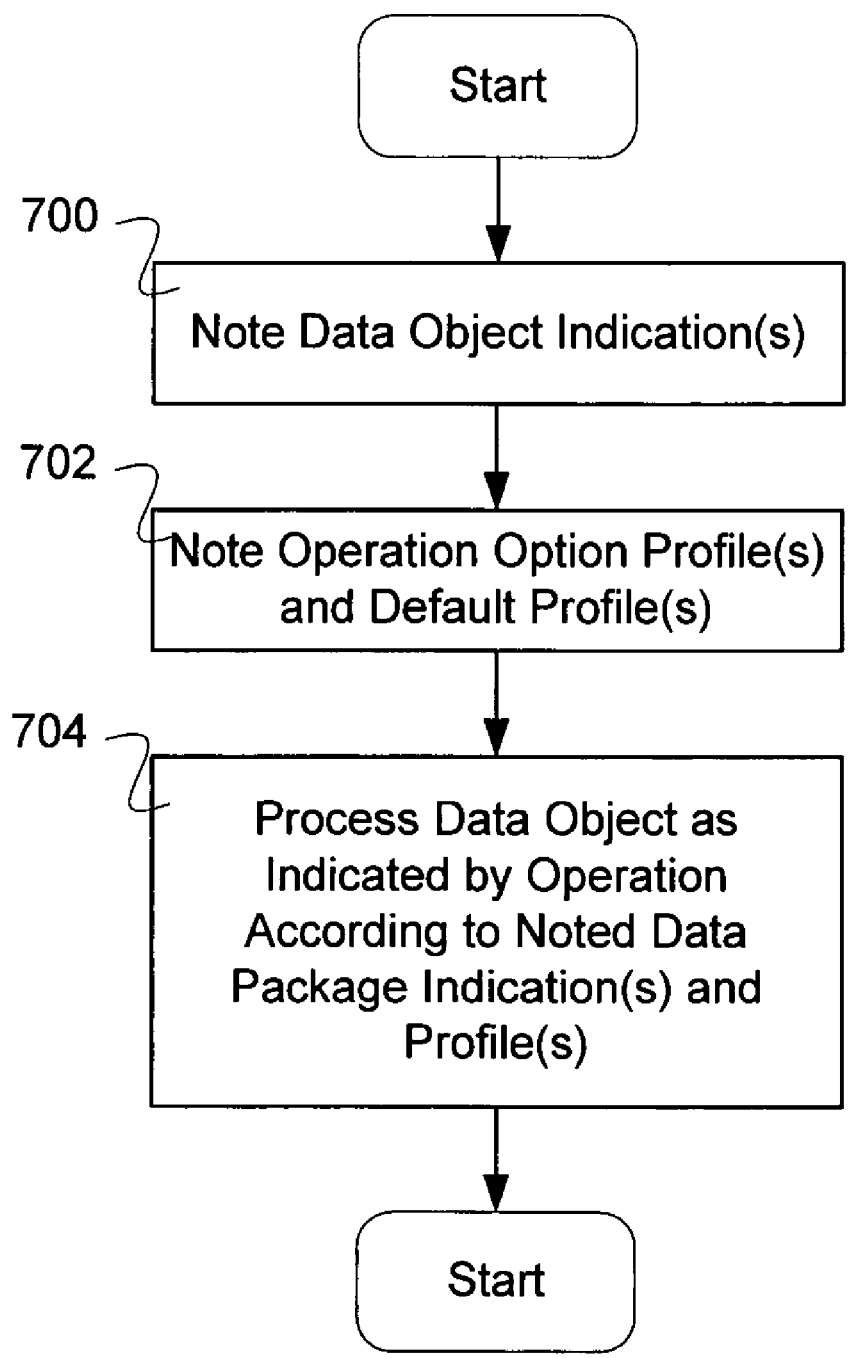
FIG. 7 is a flow diagram illustrating an embodiment of a process for processing an object.

FIG. 7 is a flow diagram illustrating an embodiment of a process for processing an object. In some embodiments, the process of FIG. 7 is used to implement 602 of FIG. 6. In the example shown, in 700 data object indication(s) are noted. In 702, operation option profile(s) and default profile(s) are noted. In 704, data object is processed as indicated by operation according to noted data package indication(s) and profile(s).

Figure 8:
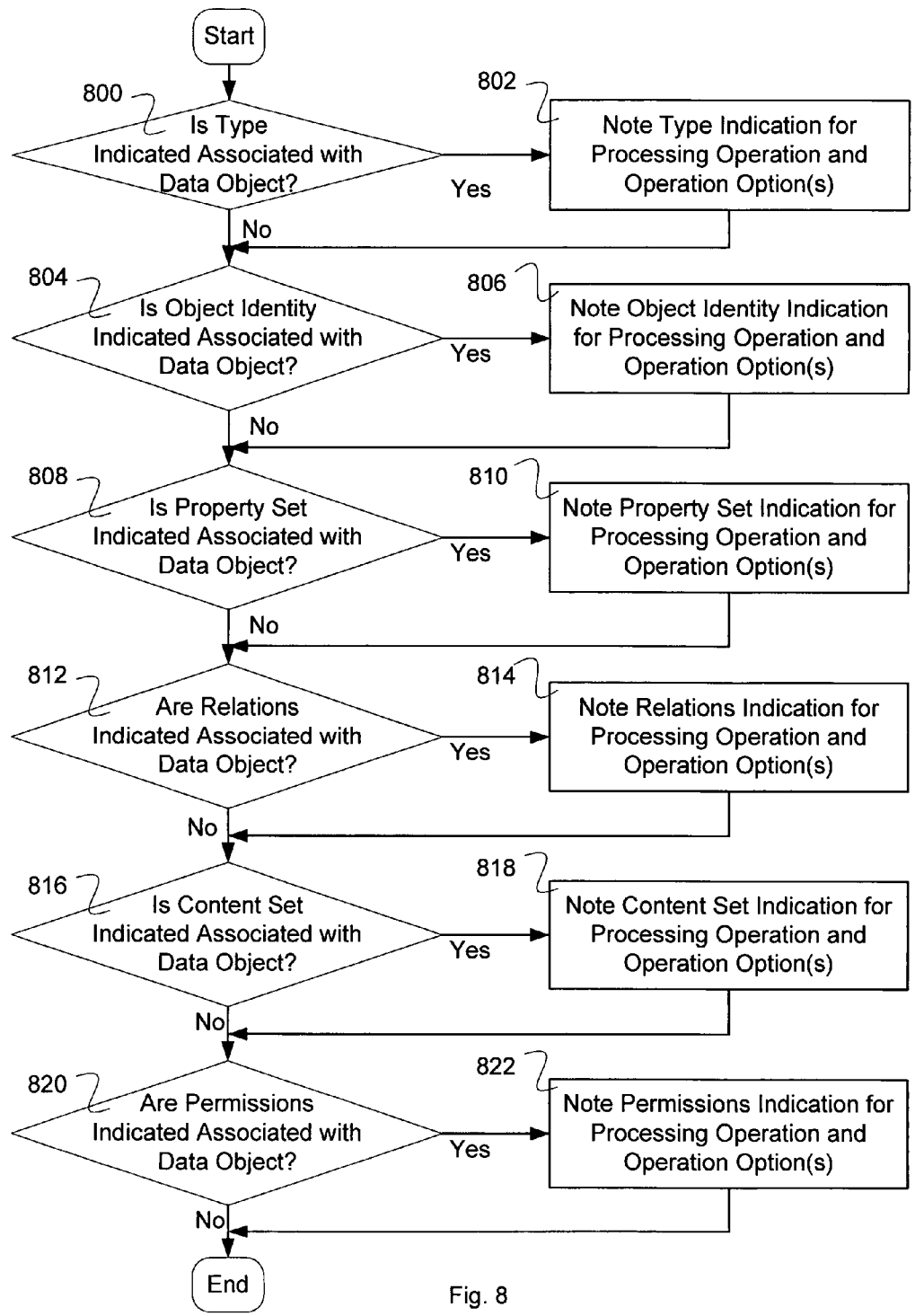
FIG. 8 is a flow diagram illustrating an embodiment of a process for noting data object indication(s).

FIG. 8 is a flow diagram illustrating an embodiment of a process for noting data object indication(s). In some embodiments, the process of FIG. 8 is used to implement 700 of FIG. 7. In the example shown, in 800 it is determined if a type indication is associated with data object. If there is a type indication associated, then in 802 the type indication is noted for processing operation and operation option(s), and control passes to 804. If there is not a type indication associated, then control passes to 804. In 804 it is determined if an object identity indication is associated with data object. If there is an object identity associated, then in 806 the object identity is noted for processing operation and operation option(s), and control passes to 808. If there is not an object identity associated, then control passes to 808. In 808 it is determined if a property set indication is associated with data object. If there is a property set associated, then in 810 the property set is noted for processing operation and operation option(s), and control passes to 812. If there is not a property set associated, then control passes to 812.

In 812 it is determined if relations are associated with data object. If there are relations associated, then in 814 the relations indications are noted for processing operation and operation option(s), and control passes to 816. If there is not a relations indication associated, then control passes to 816. In 816 it is determined if a content set indication is associated with data object. If there is a content set associated, then in 818 the content set is noted for processing operation and operation option(s), and control passes to 820. If there is not a content set associated, then control passes to 820. In 820 it is determined if a permissions indication is associated with data object. If there are permissions associated, then in 822 the permissions are noted for processing operation and operation option(s), and the process ends. If there are not permissions associated, then the process ends.

Figure 9:
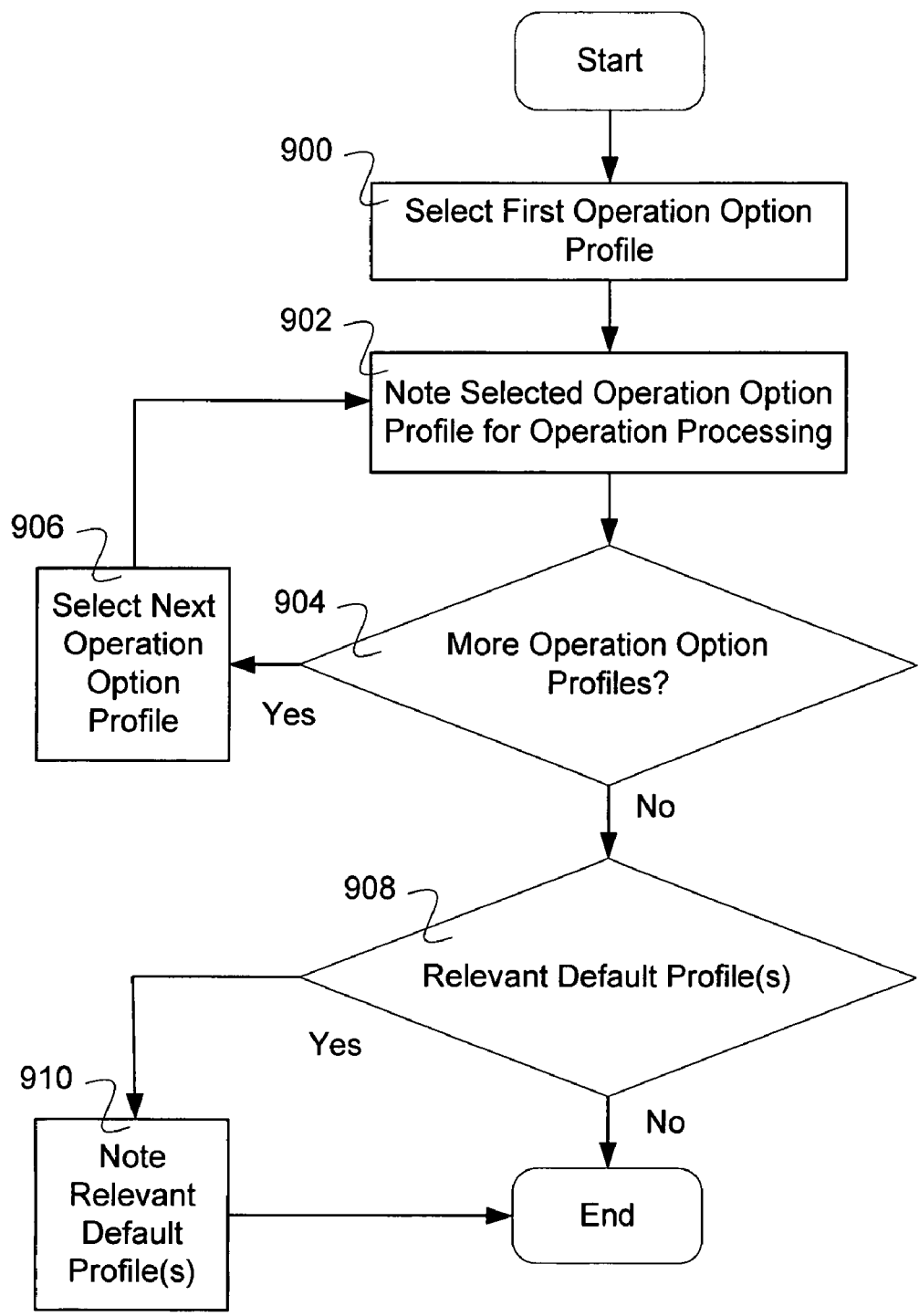
FIG. 9 is a flow diagram illustrating an embodiment of a process for noting profile(s).

FIG. 9 is a flow diagram illustrating an embodiment of a process for noting profile(s). In some embodiments, the process of FIG. 9 is used to implement 702 of FIG. 7. In the example shown, in 900 a first operation option profile is selected. In 902, the selected operation option profile is noted for operation processing. In 904, it is determined if there are more operation option profiles. If there are more profiles, then in 906, a next operation option profile is selected, and control passes to 902. If there are not more profiles, then in 908 it is determined if there are relevant default profile(s). If there are relevant default profile(s), then in 910, relevant default profiles are noted, and the process ends. If there are no relevant default profiles, then the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a data package, comprising:
   receiving an operation including a data package and one or more operation options, wherein the data package is used to pass information between a server and a client, wherein the data package includes an object list and one or more of slots for data objects;
   receiving an operation option, wherein the operation option is used to modify a performance of the operation; and
   performing, using a processor of the server or of the client, the operation with respect to each of one or more data objects included in the data package, in a manner determined at least in part by the operation option and one or more default settings of a context data applicable to the operation, wherein the operation is one of the operations in a group includes a repository object operation, a version operation, a schema operation, a repository retrieval operation, and a workflow operation;
   wherein the context data is associated with a communication session between the server and the client; wherein without the operation option, the context data is configured to cause performance of the operation in a first manner and wherein an addition of the operation option to the context data is configured to cause performance of the operation in a second manner that is different from the first manner.

2. A system for processing a data package, comprising:
   a processor; and
   a memory coupled with the processor, wherein the memory is configured to provide the processor with instructions which when executed cause the processor to:
   receiving an operation including a data package and one or more operation options, wherein the data package is used to pass information between a server and a client, wherein the data package includes an object list and one or more of slots for data objects;
   receiving an operation option, wherein the operation option is used to modify a performance of the operation; and
   perform the operation with respect to each of one or more data objects included in the data package, in a manner determined at least in part by the operation option and one or more default settings of a context data applicable to the operation, wherein the operation is one of the operations in a group includes a repository object operation, a version operation, a schema operation, a repository retrieval operation, and a workflow operation;
   wherein the context data is associated with a communication session between the server and the client; wherein without the operation option, the context data is configured to cause performance of the operation in a first manner and wherein an addition of the operation option to the context data is configured to cause performance of the operation in a second manner that is different from the first manner.

3. The system as in claim 2, wherein the data object includes one or more of the following: a type, an object identity, a property set, one or more relations, a content set, and one or more permissions.

4. The system as in claim 2, wherein the repository object operation comprises one of the following: create, create a path, get, update, delete, copy, move, validate, and get object content.

5. The system as in claim 2, wherein the version operation comprises one of the following: get check out information, check out, check in, cancel check out, delete version, delete all versions, get current, and get version information.

6. The system as in claim 2, wherein the schema operation comprises one of the following: get schema information, get repository information, get type information, get property information, and get dynamic assist values.

7. The system of claim 2, wherein the repository retrieval operation comprises one of the following: query, structured query, pass through query, query execution, and get repository list.

8. The system as in claim 2, wherein the workflow operation comprises one of the following: get process templates stored in repository, get process information, and start process.

9. The system as in claim 2, wherein the context data comprises a context profile.

10. The system as in claim 9, wherein the context data comprises an operation option context profile.

11. The system as in the claim 10, wherein the operation option context profile comprises one or more of the following: a property profile, a permission profile, a relationship profile, and a content profile.

12. A computer program product for processing a data package, the computer program product being embodied in a non-transitory computer readable medium and comprising computer instructions for:
   receiving an operation including a data package and one or more operation options, wherein the data package is used to pass information between a server and a client, wherein the data package includes an object list and one or more of slots for data objects;
   receiving an operation option, wherein the operation option is used to modify a performance of the operation; and
   performing, using a processor of the server or of the client, the operation with respect to each of one or more data objects included in the data package, in a manner determined at least in part by the operation option and one or more default settings of a context data applicable to the operation, wherein the operation is one of the operations in a group includes a repository object operation, a version operation, a schema operation, a repository retrieval operation, and a workflow operation;
   wherein the context data is associated with a communication session between the server and the client; wherein without the operation option, the context data is configured to cause performance of the operation in a first manner and wherein an addition of the operation option to the context data is configured to cause performance of the operation in a second manner that is different from the first manner.

* * * * *